March 12, 1957
C. W. STEWART
2,784,590
COMBINED METER AND REGULATOR
Filed Nov. 30, 1953
2 Sheets-Sheet 1
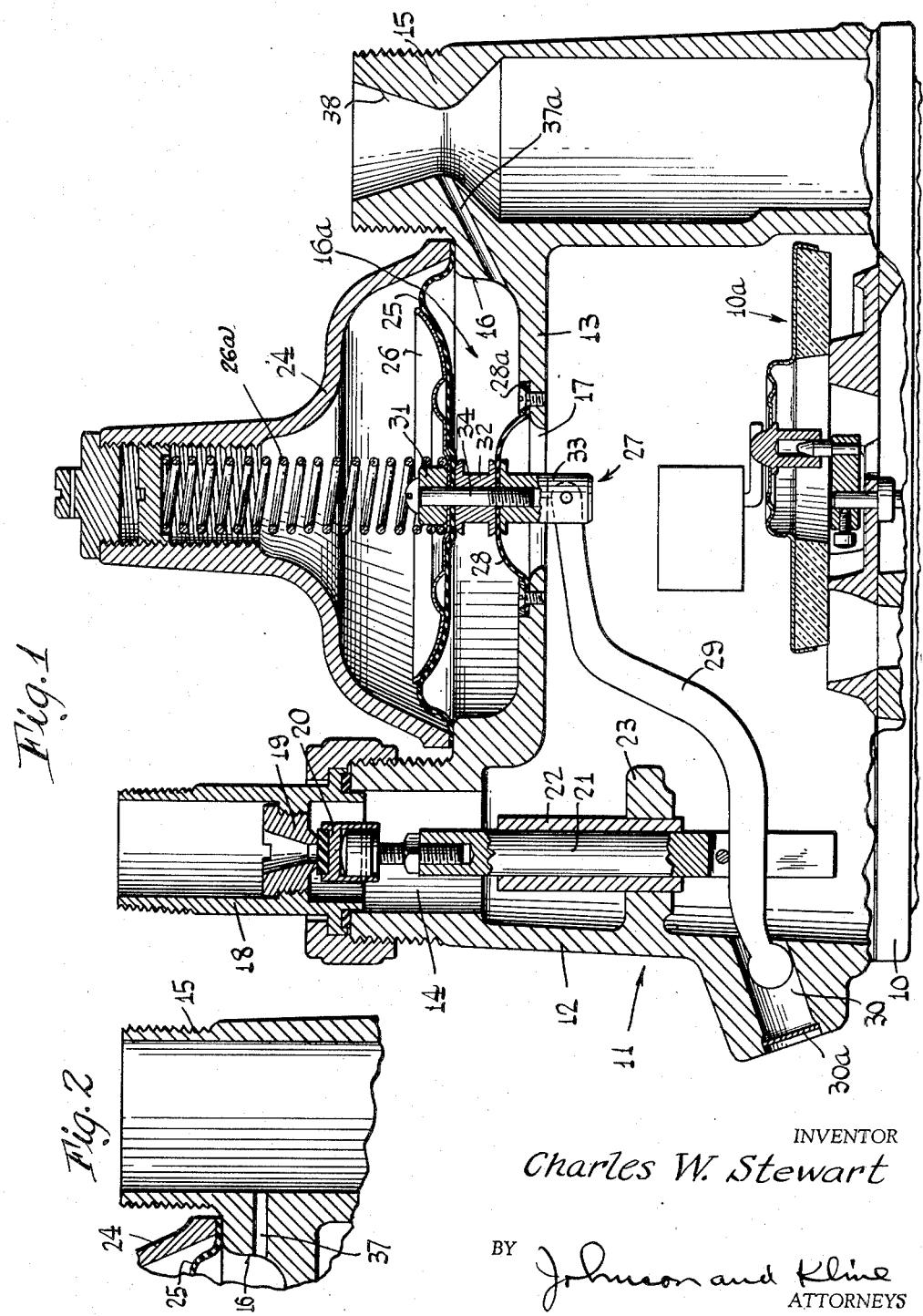
INVENTOR
*Charles W. Stewart*
BY *Johnson and Kline*
ATTORNEYS

2,784,590
COMBINED METER AND REGULATOR

Charles W. Stewart, Fairfield, Conn., assignor to Sprague Meter Company, Bridgeport, Conn., a corporation of Connecticut Application November 30, 1953, Serial No. 395,065

1 Claim. (Cl. 73—199)

The present invention relates to a combined gas meter and regulator and more particularly to an arrangement thereof providing improved control of the delivery pressure.

Heretofore, it has been attempted to control the delivery pressure by means of a regulator controlled by the pressures within the meter. The difficulty with such an arrangement, however, is that as the demand and consequent flow of gas through the meter increases, the increase in the meter loss caused by friction of the moving parts tends to decrease the delivery pressure.

It is an object of the present invention to overcome these difficulties by providing a combined meter and regulator in which the regulator is formed as part of the cover and is controlled by the conditions in the outlet of the meter rather than by the pressure in the meter to maintain a more uniform pressure in the delivered gas.

This is accomplished by forming the cover with a passage connecting the pressure chamber of the regulator to the outlet of the meter so that the conditions in the outlet will control the operation of the regulator diaphragm and hence control the inlet valve for the meter.

While the regulator can be controlled by the pressure in the outlet, it is at present preferred to control it both by the pressure in the outlet and in accordance with the rate of flow of gas through the outlet so that more accurate control can be achieved.

This control is obtained by providing a Venturi in the outlet and connecting the pressure chamber of the regulator to the throat of the Venturi so that the pressure in the outlet as well as the Venturi action will reduce the pressure in the pressure chamber to slightly below that actually delivered to aid in compensating for any losses occasioned by the increased flow of gas so that a more accurate control may be had.

Other features and advantages of the invention will be apparent from the specification and claim when considered in connection with the drawings in which:

Figure 1 shows a sectional view of the cover of the combined gas meter and regulator.

Fig. 2 is a detailed fragmentary view of another form of the invention.

Figure 3:
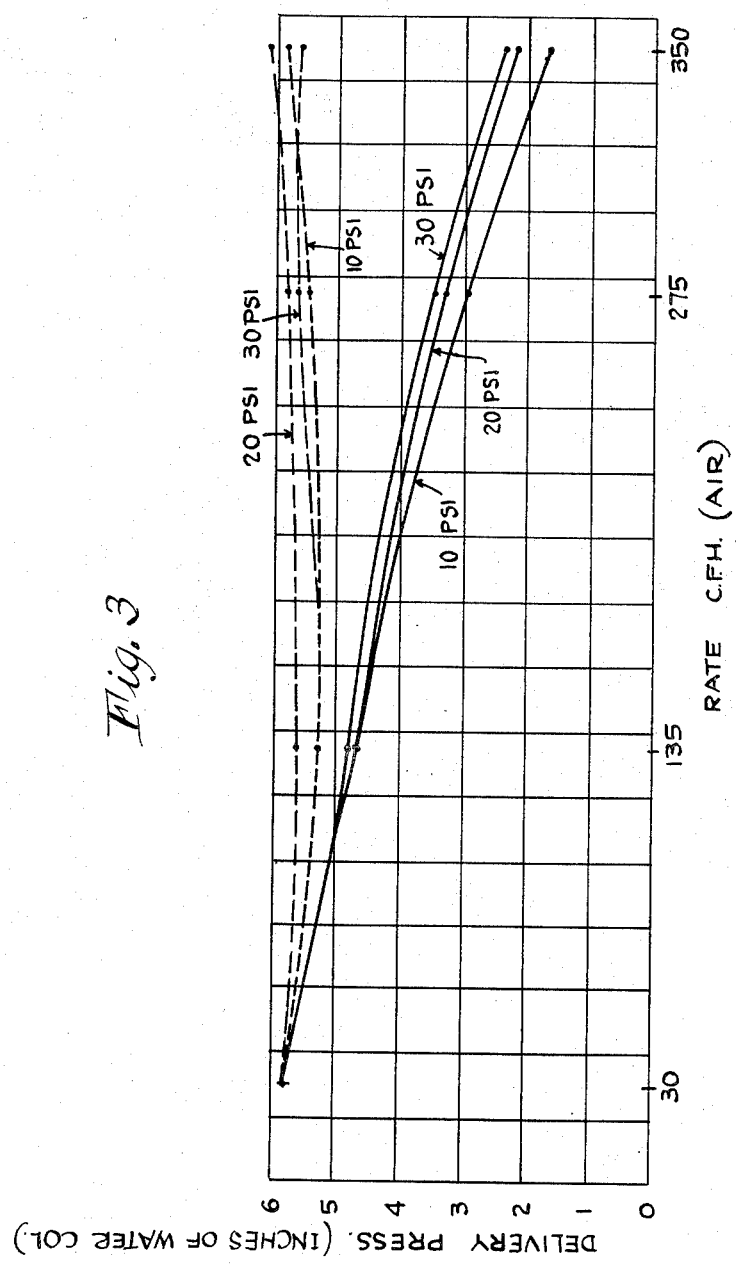
Fig. 3 shows a chart illustrating the pressure variation when the regulator is controlled by the pressure in the meter and when controlled by the outlet.

As shown in the drawings, a meter 10 having the usual meter mechanism 10a is provided with a cover 11 therefor secured thereto in sealing relation. The meter cover has side walls 12 and a top wall 13. The top wall is provided with an inlet 14 and an outlet 15 projecting upwardly therefrom. Formed in the top wall between the inlet and the outlet is a dish-shaped recess 16, having a small central aperture 17. As shown in Fig. 1, the inlet has a threaded nipple 18 secured thereto and provided with a valve seat 19 adapted to cooperate with a valve 20 carried by a valve operator 21 slidable in a sleeve 22 carried in a boss 23 on the side wall of the cover. The valve operator 21 is controlled by the regulator means as will be described.

The regulator is provided with a dome-shaped portion 24 adapted to clamp a diaphragm 25 around the edges of the dish-shaped recess 16 so as to form therewith a pressure chamber 16a for the regulator. If desired the diaphragm is provided with a backing plate 26 and is loaded by the usual spring 26a.

A valve actuator 27 is connected to the diaphragm to project through the aperture 17. The aperture 17 through which the actuator extends is closed by a flexible seal 28 clamped to the wall by a clamping ring 28a so that the pressure chamber is separated from the meter chamber. The end of the actuator extending into the meter has pivotally secured thereto an actuator arm 29 which extends under the valve operator 21, as shown in Fig. 1, and has the other end pivotally supported in a bore 30 in the side of the cover, which bore is sealed by a plate 30a. The valve operator will, therefore, be actuated in response to movement of the diaphragm 25 to open or close the intake valve.

While the actuator member may have various constructions, it is herein illustrated as comprising a washer 31 engaging the top of plate 26 on one side of the diaphragm, a spool 32 disposed between the diaphragm and the flexible seal 28 and an arm-supporting boss 33 engaging the lower face of the seal, all of which are secured together in clamping relation by a bolt 34 passing through the washer and spool and threaded into the boss, thereby providing a construction which can be readily assembled.

While the pressure chamber for the regulator may be connected directly to the outlet 15 by a passage 37, as shown in Fig. 2, so that the regulator is controlled solely by the pressure in the outlet, it is at present preferred to provide the outlet 15 with a Venturi 38 adjacent the mouth thereof and connect the pressure chamber of the regulator to the throat of the Venturi by a passage 37a to control the diaphragm thereby.

Although the flexible seal has the meter pressure applied to the inner side thereof, its effect on the action of the actuator is negligible since it has a relatively small area as compared to the diaphragm 25 and the meter pressure is substantially counterbalanced by the outlet pressure on the other side thereof.

Since the pressure in the pressure chamber is controlled by the delivery pressure and the diaphragm is actuated by the pressure in the chamber, the operation of the combined meter and regulator will overcome the effect of any pressure losses in the meter.

Further, when the outlet is provided with a Venturi, the flow of gas passing therethrough to meet the increased demand will cause a drop in pressure in the pressure chamber below the actual pressure in the outlet. These conditions in the outlet will cause a greater opening of the valve and, in effect, compensate for increased meter losses due to the higher flow of gas through the meter and will tend to keep the delivery pressure to the required amount.

This is best seen from the chart of Fig. 3 wherein the desired delivery pressure is set at 5.8 inches of water column at a flow of 30 C. F. H. The solid lines show the outlet pressure for various inlet pressures at different flow rates in a meter in which the regulator is controlled by the meter pressure, while the dash lines show outlet pressure for similar inlet pressures at different flow rates in accordance with the present invention. It will be noted from the solid lines of the chart that the delivery pressure drops off rapidly as the rate of flow increases so that for the 10 p. s. i. pressure there is a drop of 4.1 inches of water column to 1.7" at 350 C. F. H.; the 20 p. s. i. curve drops to 2.2" and the 30 p. s. i. drops to 2.4" which is a substantial loss of delivery pressure;

whereas, in accordance with the present invention, it will be noted that the 10 p. s. i. curve while dropping off at 150 C. F. H. comes back up to the initial value at 350; the 30 p. s. i. curve shows 5.6 inches of water column at 350 while the 20 p. s. i. curve is raised to 6.1", showing a slight increase in delivery pressure.

Thus, it will be apparent that the present invention produces a substantial improvement in control over delivery pressure over those devices heretofore known, there being a maximum drop of .5 inch throughout the complete range.

The cover of the present invention not only can be mounted on a meter as original equipment, but it can be employed as a replacement for covers for combination meters having the regulator controlled by the meter pressure without altering the meter and will produce the improved results as set forth herein.

Variations and modifications may be made within the scope of the claims and portions of the improvements may be used without others.

I claim:

In a combined gas meter and regulator, a cover for the meter provided with an inlet and outlet for the meter projecting upwardly from the top thereof and an inwardly extending dish-shaped portion disposed therebetween in the top wall provided with a small central opening; valve means mounted on said inlet to control the flow of gas through said inlet; a regulator having a dome and a diaphragm clamped to the cover by said dome to overlie said dish-shaped portion and cooperate therewith to form a pressure chamber; a flexible seal connected to the wall adjacent the central opening to separate said pressure chamber from said meter; an assembled actuator connected to the diaphragm and extending through said flexible seal and into said meter, said assembled actuator comprising a washer engaging the outer face of the diaphragm, a spool disposed between the diaphragm and flexible seal, an arm-connecting boss disposed on the opposite side of the flexible seal and a bolt extending through the washer and spool and threaded into a threaded recess in the boss to clamp said parts together and to secure the diaphragm and the flexible seal thereto; spring means in the dome urging the actuator to a predetermined position; a removable plug carried by the dome in alignment with the bolt; and an actuating arm having one end pivotally connected to the boss and the other end pivotally connected to the side of the cover, said arm having means intermediate the ends connected to said inlet valve means to control the operation of the valve means in accordance with the pressure in said pressure chamber, there being a passage in said cover connecting the pressure chamber to said outlet whereby the regulator controls said valve means in accordance with the outlet pressure.

References Cited in the file of this patent

UNITED STATES PATENTS

| 1,702,144 | Griswold | Feb. 12, 1929 |
| 2,255,219 | Hutchinson et al. | Sept. 9, 1941 |
| 2,274,697 | Hutchinson et al. | Mar. 3, 1942 |

FOREIGN PATENTS

| 508,604 | Belgium | Feb. 15, 1952 |
| 178,273 | Switzerland | July 15, 1935 |